Figure 1:
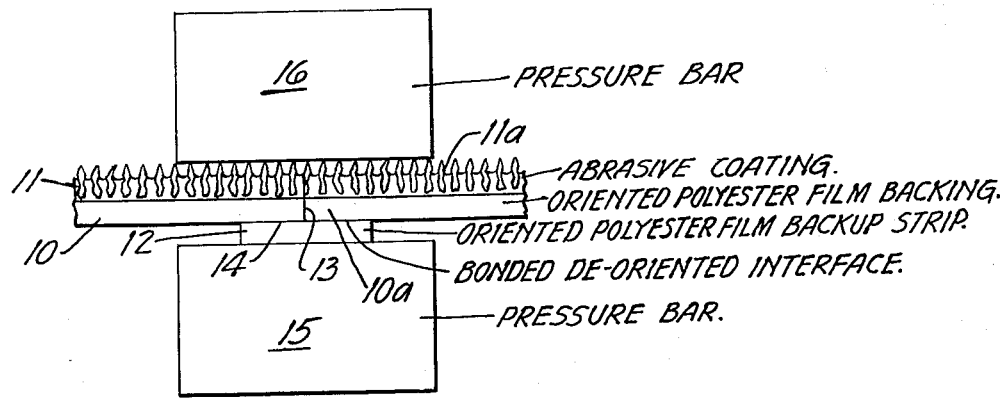

Jan. 22, 1963  L. C. KROGH  3,074,789
METHOD OF SPLICING COATED FLEXIBLE FILMS AND PRODUCT THEREOF
Filed Feb. 16, 1959

INVENTOR
LESTER C. KROGH
BY
Carpenter, Abbott, Coulter & Kinney
ATTORNEYS 3,074,789
METHOD OF SPLICING COATED FLEXIBLE FILMS
AND PRODUCT THEREOF
Lester C. Krogh, Roseville Village, Minn., assignor to Minnesota Mining and Manufacturing Company, St. Paul, Minn., a corporation of Delaware
Filed Feb. 16, 1959, Ser. No. 793,540
11 Claims. (Cl. 51—293)

The present invention relates to the lap splicing of surface-coated oriented high molecular weight linear polyester films. A specific and preferred aspect of this invention concerns endless flexible coated abrasive belts formed by splicing coated abrasive sheet material having a linear biaxially oriented polyethylene terephthalate film backing. This application is in the nature of a continuation-in-part of copending Krogh et al. application Serial No. 552,684, filed November 7, 1955.

Films of linear polyester resins, which are drawn, "tensilized" or "oriented" in both the lengthwise and crosswise directions, exhibit excellent qualities as flexible backings for various coated sheet structures such as abrasive sheets, magnetic recording tapes, etc. Such polymeric esters are formed substantially of terephthalic acid and of one or more of various ethylene glycols, although often containing some amounts of other dibasic acids such as isophthalic and sebacic acids and other types of glycols. In film form, these materials are extremely strong and tough, are not softened by water or oils, are not affected by the usual organic solvents, and retain their strength and flexibility over wide ranges of temperatures, e.g., from $-30°$ C. to $+150°$ C.

Although the advantageous properties of oriented linear polyester films have been known, and the desire to utilize these properties in coated polyester film composites has been appreciated, until recently it was not known how to adhere resinous coatings sufficiently firmly to such films so as to provide really practical products. Particularly was this true where the resinous coatings approached any substantial thickness relative to the thickness of film used. Technological advances now have provided such coated structures. The aforementioned parent application Serial No. 552,684 teaches the manufacture of excellent polyester film-backed coated structures, especially coated abrasive sheet and other structures where the surface coatings contain particulate matter bonded to the backing film by a binder. Such structures have many advantages, many of which flow largely from the properties contributed by the polyester film backing.

Now that surface-coated linear oriented polyethylene terephthalate film structures have become known and available, it is highly desirable that means be provided by which the backing films of such structures can be strongly spliced or sealed. Specifically, coated abrasive sheets spliced into continuous lengths as belts find extremely wide commercial usage. It is thus especially desirable that such spliced polyester film-backed abrasive products be provided.

Certain practical criteria are to be observed in providing means for splicing surface-coated polyester film-backed structures. Since in many instances the very advantageous properties lent to the composite structures by the polyester film backings result from the oriented and/or "tensilized" properties thereof, practical necessity requires splices or seals of such structures to be effected without substantial de-orientation or deterioration of the backing film. Moreover, in order to be effective, splices must be strong. Indeed, the splice often must be at least as strong as the coated film composite itself when the structure is pulled under tension across the splice. On the other hand, the strength must be attained with some practical limitation on the amount of film overlap which forms the splice. Bonding must be firm uniformly throughout the splice so that corners or edges do not come loose.

In accordance with the present invention I am able to provide strong firmly bonded splices of surface-coated high molecular weight polyethylene terephthalate films, wherein the spliced portions of the film remain substantially fully oriented. In obtaining the splices hereof I fuse the film surfaces to be joined with the aid of a small amount of true solvent composition for the linear biaxially oriented polyethylene terephthalate film. As more particularly described hereinafter, the solvent composition is applied in liquid form to one or both of the film surfaces to be joined. Thereafter the surfaces are conjoined and subjected to pressure, and sometimes heat, for a time sufficient to complete the splice but insufficient to degrade or otherwise to deleteriously affect the film backing. Since initially oriented polymers are de-oriented (but not molecularly degraded) when dissolved by true solvents therefor, and remain so even after the solvent is removed, the interfacial areas at the conjoined and fused film surfaces may be characterized by the presence of an extremely thin layer of de-oriented film. In being de-oriented the polyester thus is returned from its highly crystalline to a partially or substantially entirely amorphous state. However, the thickness of the de-oriented interfacial portion is only very slight, and the strength of the treated film remains substantially unchanged. As examples of the true solvents for polyethylene terephthalate which are suitable as splicing agents in accordance with the teachings hereof, are included: phenol, o-chlorophenol, p-chlorophenol, m-chlorophenol, o-bromophenol, p-bromophenol, 2,4-dibromophenol, 2,4-dichlorophenol, catechol, resorcinol, 4-chlororesorcinol, 5-methyl resorcinol (orcinol), o-cresol, m-cresol, p-cresol, 4-chloro-2-methyl phenol, 1-naphthol, 2-naphthol, dichloroacetic acid, trichloroacetic acid, trifluoroacetic acid, monochloroacetic acid, monobromoacetic acid, 2-chloro-4-phenyl phenol, 2,4-dimethylphenol, 2,6-dimethylphenol, 3,4-dimethylphenol, 3,5-dimethylphenol, p-ethyl phenol, 2,4-dichloroaniline, 2,6-bromophenol.

Insofar as I am aware, no one, prior to this invention, has successfully spliced surface-coated oriented linear polyethylene terephthalate film composites such as coated abrasive sheets. Nor has anyone heretofore provided spliced surface-coated oriented polyester film structures wherein a splice, containing as little as one-half inch or less overlap of the joined surfaces, is as strong when the film is pulled in tension across the splice as the polyester film itself in thicknesses of about 1½ mils or greater. The present invention provides such structures.

Recently others have concerned themselves with the heat sealing of very thin uncoated polyester films for package sealing, and similar uses. In this regard, see Amborski Patent No. 2,820,735 and Smith Patent No. 2,849,359, granted January 21, 1958, and August 26, 1958, respectively (subsequent to the filing date of the aforesaid parent application Serial No. 552,684). These patents, however, do not concern themselves with the provision of strongly bonded splices in surface-coated polyester film structures.

Actually, coated linear biaxially oriented polyester films, especially those wherein the coating contains particulate material, take on such different properties from the uncoated films as to be essentially different entities therefrom. The problems of sealing or splicing them are much different. This rather surprising fact will be readily observed in conjunction with the aforementioned Amborski and Smith patents themselves wherein those splicing agents disclosed as being most preferred I have found to be entirely unsatisfactory; and those I have found to be operable and preferred either are not comprehended at all by the patentees or (in two isolated instances) are expressly considered by them to be inferior to agents I find entirely inoperable and useless.

More particularly, Amborski discloses the heat sealing of thin polyethylene terephthalate packaging films utilizing benzyl alcohol as a sealing agent to be applied to the surfaces of the film to be joined. The Smith patent likewise discloses the heat sealing of such thin films, specifically in thicknesses of 1½ mils, under pressure, with the aid of one or more of some 27 compounds. Said compounds characterized as "incipient plasticizers" are applied to the film surfaces to be joined to aid in obtaining the desired heat seals. Among the many incipient plasticizers disclosed, benzyl alcohol and anisole are classified by Smith as being "excellent."

Notwithstanding their reputed "excellence" for use in sealing uncoated polyester films, I have found benzyl alcohol and anisole to be essentially useless in providing splices of the surface-coated film composites hereof. On the other hand, two other compounds disclosed by Smith, namely, phenol and catechol, and rated by the patentee as being less than "excellent" for heat sealing uncoated polyester film, have been found to be extremely effective in splicing coated film composites in accordance with the present invention. (The remaining "incipient plasticizers" disclosed by Smith, like benzyl alcohol and anisole, are essentially useless for our purposes.)

Figure 2:
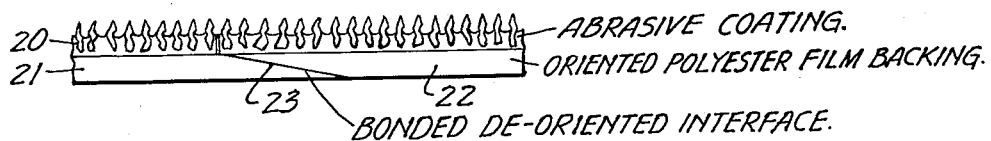

Various types of splice can be fabricated in accordance with the procedures hereof. In the accompanying schematic drawing are illustrated two types of splice which can be suitably employed in the splicing of coated abrasive structures, e.g., to form continuous flexible abrasive belts. In the drawing dimensions are exaggerated in the interest of clarity. FIGURE 1 is an edge-on view illustrating a so-called butt splice, where two belt ends 10 and 10a of polyester film having an abrasive coating 11 and 11a thereon are placed in abutting relation and then spliced or joined together with the aid of a narrow backup strip 12. The latter, centered over the line of abutment 13 between ends 10 and 10a, laps the back surfaces of said ends immediately on each side of said line. Firm bonding is effected at the interface 14 between ends 10 and 10a, on the one hand, and backup strip 12, on the other hand, by treating or coating one or both of the joined surfaces with a true solvent for polyethylene terephthalate, followed by pressing the joined film structures between opposed pressure bars 15 and 16 which extend laterally along the splice and against the surfaces thereof. Immediately adjacent the interface 14 an extremely thin interfacial area of de-oriented polyester is formed. Said pressure bars 15 and 16 preferably having heating elements therein. FIGURE 2 is an edge-on view showing a so-called lap splice. In this type of splice, a portion of coated abrasive surface 20 is carefully skived away from the end portion of one belt end 21 and the exposed film is tapered toward the end edge. The back surface of the other belt end 22 is matingly tapered. The mating surfaces of backing film ends 20 and 21 are treated with a true solvent as defined herein, and the ends then lapped and bonded together along the interface 23 of contact at which a thin de-oriented interfacial area exists. It will thus be seen that although the type of splice illustrated in FIGURE 1 is referred to as a butt splice, actually the splice is effected in each instance by a polyester film which laps the back surface of a previously surface-coated high molecular weight polyester film structure, bonding occurring at the interface of the lapped surfaces in the plane of the spliced sheets. In any event, the abrasive coating is essentially undisrupted across the splice.

Having now described my invention in a general way, the following specific examples will serve to facilitate an understanding thereof.

*Example 1*

Flexible coated abrasive sheet material was first prepared as follows: A 5 mil film of oriented polyethylene terephthalate polymer ("Mylar") having a tensile strength of about 85 lbs. per inch of width was coated with a 60%, by weight solution in xylene of para-chlorophenol. Application of the coating changed the lustrous surface of the film to a non-lustrous translucent appearance, the tensile strength of the film having been reduced slightly to about 83 lbs. per inch. Over the thus primed surface was then coated an abrasive binder composition consisting of 100 parts of a liquid epoxy resin (the diglycidyl ether of bisphenol A, sold commercially as Shell "Epon 828"), 14 parts of meta-phenylenediamine catalyst and 10 parts of ethylene glycol monoethyl ether ("Cellosolve"), all by weight, the resulting composition having a viscosity of about 800 cps. Wet coating weight of the binder composition was 28 grains per 24 sq. inches. To the abrasive binder-coated surface of the film was applied 144 grains of grade 50 aluminum oxide abrasive grains per 24 sq. in. by conventional electrostatic coating procedures. The thus coated composite was hung in festoons and precured for one hour at 250° F. It was then coated with the sandsize adhesive comprising a solution of a conventional water-soluble "A stage" phenol formaldehyde resin (79% non-volatiles) containing 68% calcium carbonate based on total weight of non-volatiles. The sized composite was again festooned, and then precured for 1½ hours at 175° F., after which it was wound onto a drum and finally cured for 2 hours at 212° F. and 3 hours at 250° F. Total thickness of the sheet composite was 33 mils, the abrasive coating thus being about 28 mils thick.

The cured coated abrasive material was then flexed by passing it between a rubber roller and a one inch rotating steel bar, and around the latter, which contacted the uncoated side of the film. Following flexing, the abrasive coated sheet material was prepared for converting into endless abrasive belts by being slit into 3-inch widths and cut to lengths of about 90 inches. The ends of one of the abrasive strips were then brought together in overlapped end-to-end face-to-back relation and die-cut along a straight line extending 45° to the belt edges, the resulting continuous length of the belt being 84 inches.

The belt ends were then butt spliced as shown in FIGURE 1 as follows: A backup strip of biaxially oriented 5 mil polyethylene terephthalate film having a width of ¼ inch and a length of about 4½–5 inches (somewhat greater than the length of the 45° diagonal end edge of the belt) was smeared on one surface thereof with a thin coating of liquid p-chlorophenol heated to about 50° C. With the belt ends positioned in mating abutting juxtaposition along the lower bar of a splicing press (backing film surface uppermost), the backup strip was then applied to the belt ends with the solvent treated surface thereof in contact with said ends. The center of the backup strip was positioned directly over the line of abutment of the belt ends so the backup strip lapped each belt end about ⅛ inch. Then, with both bars of the splicing press heated to and maintained at a temperature of 260° F., the bars of the press were closed and the splicing area, i.e., the total belt area overlapped by the backup strip, was subjected to a force of 5 tons for a period of about 10 seconds, after which the belt was removed from the press. Any length of the backing strip extending beyond the lateral edges of the belt was trimmed away.

The resulting splice appeared strong and there was substantially no distortion or puckering of either the belt or the backup strip at the splice. Bonding was uniform. The backup strip could not be peeled off at any edge or corner.

The thus completed belt was then mounted on a conventional grinding machine, where it was entrained over an 8-inch diameter rubber contact wheel and driven at a speed of 5,000 surface feet per minute. The splice was found to be entirely satisfactory in the sanding of wide and narrow cold rolled steel test pieces, as well as glass, in both wet and dry sanding operations. It did not separate, even at the corners thereof.

After the sanding tests just described were completed, the belt was removed from the machine. A 1 inch by 7 inch test strip including a portion of the splice was die-cut longitudinally from the belt. The strip was then pulled in tension along its length until failure. Failure occurred in the strip other than at or immediately adjacent to the splice. In other words, when the structure was pulled along the plane of the splice, the splice was stronger than the belt itself containing a 5 mil oriented polyester film backing.

In the present example the p-chlorophenol solvent utilized melts at 43° C. It thus was conveniently employed in unmodified liquid state. Many splicing solvents suitable for use in accordance with the teaching hereof, including several among the preferred agents hereinbefore listed, similarly are liquid at or somewhat above room temperature, and thus can be employed in the manner of the present example.

Many true solvents for the polyethylene terephthalate films, i.e., which dissolve the film material rather than forming some soluble reaction product therewith, can be utilized to make similarly satisfactory splices. In referring herein to "solvent" for the polyethylene terephthalate film, reference is made to the following solubility test: Ten ml. of the test compound (which is non-reactive to polyethylene terephthalate) is placed in a 50 ml. beaker and heated to 115° C. A piece of biaxially oriented polyethylene terephthalate film ¼ inch square by 5 mils thick is dropped into the heated liquid composition, and the beaker contents are maintained at the 115° C. temperature for one hour. Immediately at the end of this time, the mass is poured over a stainless steel wire mesh screen having ¹⁄₁₆ inch apertures. If no identifiable pieces of the film remain lodged on the screen, the sample is considered dissolved and the compound being tested is considered to be a "solvent" for the polyethylene terephthalate. In the event the solvent being tested is not inherently a liquid at the test temperature, it is liquefied by dissolving it in approximately 20% of a liquid, such as ethylene glycol monoethyl ether, which is neither a solvent for nor reactive with polyethylene terephthalate under the test conditions. In this case total volume of test solution will be adjusted such that the proportionate volume of the compound being tested is 10 ml.

Splicing temperatures will vary with the particular solvents employed. Several of the solvents disclosed herein, e.g., o-chlorophenol and trifluoroacetic acid, are both liquid and active at room temperature, or even somewhat below room temperature (and at elevated temperatures as well). In the instance of other solvents we employ, such as 3,4-dimethyl phenol and monobromacetic acid, higher splicing temperatures are required, e.g., in the order of 285–300° F. The press time required to form an effective splice ordinarily will vary with the splice temperature, for example from a few seconds at the higher temperatures to several minutes to an hour or more at room temperature, again depending also upon the properties inhering in particular solvents. It is important that the splicing temperature employed and the duration of the heating be not such as will substantially degrade, de-orient, pucker, or otherwise deleteriously affect the polyester film. With the splicing solvents hereof, minimum time required to effect good splices at the active temperature of the solvent used usually does not approach that where the polyester film is substantially damaged. Ordinarily, excellent splices are obtained with the solvent hereof where the splicing temperature is maintained from about 200–300° F. for a time insufficient to degrade or de-orient the polyester, i.e., for a few minutes to as low as a few seconds.

Splice pressure need only be sufficient to insure intimate firm contact of the contacting surfaces, in the order of 500 p.s.i. ordinarily being sufficient. In practical operation, however, since a surface coating, especially a particulate surface coating, may be rough and somewhat uneven, it is usually advisable to employ somewhat higher pressures in order to insure that firm pressure is distributed over the entire splice area.

While the previous example illustrates the use of liquid splicing solvents in unmodified form, modification is sometimes desirable or necessary. The following examples will illustrate this practice of my invention.

*Example II*

A 4" wide by 108" long abrasive strip containing 7½ mil biaxially oriented polyethylene terephthalate backing coated with grade 400 silicon carbide abrasive grains was prepared in the manner described in the preceding example. The ends of the strip were joined in this case in a lap splice of the type shown in FIGURE 2. The mineral, bond, and sandsize, having a nominal thickness of 1½ mils, were carefully skived from a ½ inch area along the edge of one belt end, the belt ends having previously been cut at an angle of 45° to the belt edges. The thus-exposed film backing was uniformly tapered toward the end edge to thickness of about .002". The uncoated side of the opposite belt end was tapered in a similar manner.

The fluidity and volatility of dichloroacetic acid were effectively decreased by dissolving approximately 10 parts by weight of polyethylene terephthalate in 90 parts of the acid at about 100° C., after which the solution was cooled to room temperature. A thin layer of this solution was then applied to one of the tapered surfaces of belt end previously prepared. The other tapered belt end was then mated with it in the splicing press to form a lap splice. Splicing temperature was 225° F. under a total pressure of approximately 5 tons and a press time of 25 seconds. The resulting total thickness of the splice was about 9 mils, as compared to 8½ mils for the coated abrasive material lying outside the splice area.

The belt thus prepared was then mounted on a conventional wet sanding machine designed to finish the edges of plate glass. Sheets of glass were forced against the belt as it passed over a solid steel platen while a jet of oil and water was sprayed on the grinding area. It was noted that there was essentially no splice bump, i.e., the glass plate did not chatter, bounce, or suffer nicked edges. It was also found that the splice area could be flexed at 90° over the sharp edge of a table thus without delaminating or disrupting the splice itself. A 1" x 7" strip including the splice was tested as in Example I, failure occurring other than at or adjacent to the splice.

By being thickened in the manner described in the present example, the solvent becomes more convenient to spread in that it does not so readily run from surfaces to which it is applied. Also, tendencies of highly volatile solvents to evaporate under the temperature conditions existing in the splicing operation are minimized. Although use of the polyester material itself as a thickening agent has the virtue of adding no foreign material to the splice interface, other stabilizing agents may be employed. For example, such agents as ethyl cellulose, carboxy methyl cellulose, etc. can be used.

In the present example the splice described is an overlap splice such as that shown in FIGURE 2 while in the preceding example the splice described is a butt splice containing a backup strip like that shown in FIGURE 1. Either of these types of splice, or other types of splice where the joinder is obtained by some bonded lap juncture of polyethylene terephthalate film surfaces one of which films has a coating on the surface opposite that being joined, can be employed with any of the solvents which we use. For instance, the parachlorophenol solvent employed in the formation of the butt splice of Example I also forms excellent lap splices of abrasive sheet material; e.g., by first removing the abrasive layer at one end of the polyester film-backed abrasive strip, applying a thin coating of the parachlorophenol to the thus exposed surface of the film backing and/or to an equivalent area of the back surface of the other end of the strip, and then pressing the two coated areas together under a pressure of 800 lbs. per sq. in. at a platen temperature of 270° F. for approximately 20 seconds.

Instead of being cut along a straight line, the belts may be matchingly cut along a sinusoidal, serpentine, or irregularly curved line. Thereby the tendency of the belts to fail by separation of lapped portions at any point where any sharp corner or tip exists is greatly minimized. Also the tendency of the belt to "hinge," i.e., to double sharply back upon itself at the point where the belt ends abut, is virtually eliminated. Such types of splice thus are particularly advantageous where the belt is to be entrained over extremely small contact wheels, for example, ½ inch or less in diameter.

It is not necessary that the solvents inherently be liquid at the splicing temperatures. The following example illustrates the manner of use of splicing solvents which are normally solid at temperatures well above room temperature.

*Example III*

Fifty parts of catechol (M.P. 105° C.) were added to 50 parts of ethylene glycol monoethyl ether ("Cellosolve"), solution being effected at about 100° C. This solution was used to splice grade 220 polyester film-backed abrasive material prepared as described in Example I. The thickness of the abrasive coating was 7 mils. Two 3-inch wide strips of the abrasive material having matching ends cut at an angle of 45° to the sides thereof were placed in abutting juxtaposition, film backing surface uppermost, in a splicing press. A backup strip of 3-mil polyethylene terephthalate polyester film 5 inches long and ¼ inch wide was coated with the catechol solvent solution and immediately applied in overlapping position centered atop the previously severed ends. The assemblage was then pressed at 225° F. for 25 seconds under a total force of 5 tons. When the spliced ends were removed from the press an evaluation of the splice strength was made by pulling the backup strip which extended beyond the edges of the spliced strip at an angle of 90° to the backing. It was found that the polyester film delaminated, but there was no failure of adhesion at the spliced interface. The strength of the splice exceeded the tensile strength of the abrasive-coated film when tested as in Example I.

Various other solid solvents which have been found to lend themselves to the techniques described in this example, including: catechol, resorcinol, 4-chlororesorcinol, orcinol, 1-naphthol, 2-naphthol, 2-chloro-4-phenylphenol, p-chloroaniline, 2,6-dimethylphenol, 3,4-dimethylphenol, 3,5-dimethylphenol, p-ethylphenol, 2,4-dichloroaniline, 2,6-dibromophenol.

In preparing the splices hereof, it may also be advisable to employ the solvent in solution or dispersed form even though per se they are liquids under the splicing conditions. For example, a particular solvent may be available commercially only in such form. Or, the splicing solvent may be so severe in its attack on the polyester film that it is preferable to utilize it at less than full strength. Examples of such include monochloroacetic acid, dichloroacetic acid, trichloroacetic acid and trifluoroacetic acid. Where splicing solvents are employed in diluted form, however, ordinarily a minimum of diluent sufficient to reduce the activity of the solvent to the desired degree should be employed.

*Example IV*

A stable activatable backup strip for use in butt splicing surface-coated polyester film structures was prepared as follows: One hundred parts by weight of β-naphthol was liquefied, i.e., melted, by heating to 125° C., and ten parts of polyethylene terephthalate resin were dissolved therein. While the composition was still in liquid form, a thin coating thereof was applied to one surface of a 5 mil oriented polyethylene terephthalate film strip. The coated film strip was then cooled to room temperature, the coating thereby becoming solidified and stably inactive as a solvent. Said coating was firmly adhered to the backup strip by reason of its having attacked the surface of the film during its liquid stage. The coated film could thus be stored, slit or cut to the desired size or shape. It was subsequently utilized in the manufacture of butt splices of surface-coated polyester film-backed structures, splices being effected under heat and pressure (whereby the solvent becomes liquid and active) in the manner described in previous examples.

Other true solvents for linear polyesters which I employ and which are solid at room temperature or other desired storage temperature similarly can be employed. A splicing film or tape, wherein the stably inactive solid solvent film is satisfactorily but somewhat less firmly adhered to the film, is obtained by employing the solvent without any polyethylene terephthalate dissolved therein. Also, although the stable splicing or laminating film of the present example preferably is prepared by applying the solvent composition as a melt-coating and then solidifying the same, said composition can be applied from solution in a volatile inert liquid so that, upon evaporation of the inert liquid, a cast or precipitated solid solvent surface coating remains.

The splices described in the preceding examples have all been made with coated abrasive material, for which the techniques described are particularly well suited. The splices obtained, even though overlap of the joined surfaces did not exceed in the order of one-half inch, were so strong that when the spliced surface-coated film was pulled apart in tension across the splice, failure occurred elsewhere than at the splice.

Extremely good splices can also be made on oriented polyester films to which cork or rubber particles, magnetic iron oxide, or particulate pigments such as titanium dioxide, etc., are adhered. Furthermore, although in the structures of the examples only one of the films in each lap was provided with a resinous surface coating, two films which are each surface-coated on one surface can be joined. This would be the case, for example, where two discs of abrasive coated film are combined and bonded together back-to-back to form a double abrasive coated cutoff wheel structure, or where, for greater strength or increased thickness, an uncoated disc of polyester film is incorporated between and bonded to the two abrasive coated discs. Effective splices can also be made where the film is coated on one side with a resinous or similar material containing no particulate matter, such as where the coating involves an ultraviolet light-absorbent material.

Having now described my invention, what I claim is as follows:

1. A method of splicing oriented linear polyethylene terephthalate film portions at least one of which portions contains a surface coating thereover, said process comprising providing one polyethylene terephthalate surface in the area to be joined with a thin coating of true solvent therefor, firmly pressing together the solvent-coated surface and a polyethylene terephthalate surface of the film portion to be joined therewith, and maintaining said pressure with the lapped films at a temperature where said solvent is active to polyethylene terephthalate for a time sufficient to effect a firm bond at the splice without substantially deleteriously affecting said films.

2. A method of splicing oriented linear polyethylene terephthalate film portions at least one of which portions contains a particulate surface coating thereover, said process comprising coating one polyethylene terephthalate surface in the area to be joined with a true solvent therefor, said solvent being applied in liquid form, firmly pressing together the solvent-coated surface and a polyethylene terephthalate surface of the film portion to be joined therewith, and maintaining said pressure with the lapped films at a temperature where said solvent is active to polyethylene terephthalate for a time sufficient to effect a firm bond at the splice without substantially deleteriously affecting said films.

3. A method of splicing linear oriented polyethylene terephthalate film portions at least one of which portions is an abrasive coated sheet material comprising a linear oriented polyethylene terephthalate film-backing and a layer of abrasive grits adhesively bonded to one surface thereof, the joinder in said splice being effected by a lap of the back polyethylene terephthalate surface of said abrasive sheet portion and a polyethylene terephthalate surface of the other film portion, said method comprising coating at least one surface to be joined with a true solvent for polyethylene terephthalate, said solvent being applied in liquid form, firmly pressing together the surfaces to be joined, and maintaining said pressure with the joined films at a temperature where said solvent is active to polyethylene terephthalate and for a time sufficient to effect a firm bond at the splice without substantially deleteriously affecting said films.

4. The method of claim 2 where said solvent is applied to the polyethylene terephthalate surface as a liquid solution.

5. A method of splicing linear oriented polyethylene terephthalate film portions at least one of which portions is an abrasive coated sheet material comprising a linear oriented polyethylene terephthalate film-backing and a layer of abrasive grits adhesively bonded to one surface thereof, the joinder in said splice being effected at a lap of the back polyethylene terephthalate surface of said abrasive sheet portion and a polyethylene terephthalate surface of the other portion, said method comprising coating at least one surface to be joined with a liquid composition including a true solvent for polyethylene terephthalate having polyethylene terephthalate dissolved therein, firmly pressing together the surfaces to be joined, and maintaining said pressure with the joined films at a temperature where said solvent is active to polyethylene terephthalate for a time sufficient to effect a firm bond at the splice without substantially deleteriously affecting said films.

6. A method of splicing together abutting ends of abrasive coated sheet material comprising a flexible linear oriented polyethylene terephthalate film backing and a layer of abrasive grits adhesively bonded to one surface of said backing, the joinder in said splice being effected by a polyethylene terephthalate backup strip which laps the back polyethylene terephthalate surface of said sheet material immediately on each side of the line of abutment, said method comprising coating at least one of the backup strip surface to be joined and the corresponding backing surfaces to be lapped thereby with a true solvent for polyethylene terephthalate, said solvent being applied in liquid form, firmly pressing together the surfaces to be joined between pressure bars, heating said joined films to a temperature of from 200 to 300° F. while pressure is maintained for a time sufficient to effect a firm bond at the splice without substantially de-orienting the spliced films.

7. A method of splicing together adjacent edge portions of abrasive coated sheet material comprising a flexible linear oriented polyethylene terephthalate film backing and a layer of abrasive grits adhesively bonded to one surface of said backing, said method comprising removing the abrasive grits and adhesive from one of said adjacent edges so as to bare the underlying film surface, coating at least one of said bared surface and a corresponding surface area of the polyethylene terephthalate back of the other said edge with a true solvent for polyethylene terephthalate, said solvent being applied in liquid form, overlapping said adjacent edges with said bared surface of said one edge in contact with the back surface of said other edge, firmly pressing the lapped edges together between pressure bars, heating said lapped edges at a temperature and for a time sufficient to effect a firm bond at the splice without substantially de-orienting the splice film backings.

8. A splice of surface-coated oriented linear polyester film comprising a pair of linear oriented polyethylene terephthalate film portions firmly bonded together in overlapping relation, the surface opposite the joined surface of at least one of said portions having a relatively thick resinous coating thereover and adhered thereto, said bond, when the overlap of said portion is approximately one-half inch, being at least as strong as the unspliced areas of said films in thicknesses of at least 1½ mils when said portions are pulled apart in tension.

9. An abrasive article of flexible abrasive-coated sheet material comprising a linear oriented polyethylene terephthalate backing film and a layer of abrasive grits adhesively bonded to the face surface thereof, and having a splice joint therein formed by two adjacent abutting edges of said sheet material spliced together in the plane of the sheet material by a polyethylene terephthalate backup strip which laps and is firmly bonded to the back surface of said sheet material immediately on each side of the line of abutment, an extremely thin layer of de-oriented polyethylene terephthalate being defined at the interfacial lapped and bonded areas.

10. An abrasive article of flexible abrasive-coated sheet material comprising a linear oriented polyethylene terephthalate backing film and a layer of abrasive grits adhesively bonded to the face surface thereof, and having a splice joint therein formed by two adjacent edge portions of said backing film lapped with the polyethylene terephthalate back surface of one of said portions conjoined with and firmly bonded to the polyethylene terephthalate face surface of the other of said portions, said lapped face surface being free of abrasive grits and adhesive, an extremely thin layer of de-oriented polyethylene terephthalate being defined at the interfacial lapped and bonded areas.

11. A splice joint of linear oriented polyethylene terephthalate film portions at least one of which portions is an abrasive coated sheet material comprising a linear oriented polyethylene terephthalate film-backing and a layer of abrasive grits adhesively bonded to one surface thereof, the opposite back polyethylene terephthalate surface of said film-backing portion lapping and being firmly bonded to a polyethylene terephthalate surface of the other film portion, an extremely thin layer of deoriented polyethylene terephthalate being defined at the interfacial lapped and bonded areas.

References Cited in the file of this patent

UNITED STATES PATENTS

| | | |
|---|---|---|
| 2,431,035 | Goepfert et al. | Nov. 18, 1947 |
| 2,444,830 | Kellgren et al. | July 6, 1948 |
| 2,598,090 | Yung | May 27, 1952 |
| 2,650,213 | Hofrichter | Aug. 25, 1953 |
| 2,712,987 | Storrs et al. | July 12, 1955 |
| 2,819,186 | Franck | Jan. 7, 1958 |

UNITED STATES PATENT OFFICE
CERTIFICATE OF CORRECTION

Patent No. 3,074,789                                        January 22, 1963

Lester C. Krogh

It is hereby certified that error appears in the above numbered patent requiring correction and that the said Letters Patent should read as corrected below.

Column 3, line 52, for "having" read -- have --; column 4, line 6, after "weight" insert a comma; column 5, line 71, for "solvent" read -- solvents --; column 9, line 25, for the claim reference numeral "2" read -- 3 --.

Signed and sealed this 9th day of March 1965.

(SEAL)
Attest:

ERNEST W. SWIDER                                        EDWARD J. BRENNER
Attesting Officer                                           Commissioner of Patents